March 10, 1925.

A. MARTEKA

FAUCET

Filed Nov. 22, 1923

1,529,492

INVENTOR.
Anthony Marteka
BY
H. D. Penney  ATTORNEY.

Patented Mar. 10, 1925.

1,529,492

UNITED STATES PATENT OFFICE.

ANTHONY MARTEKA, OF WHITINSVILLE, MASSACHUSETTS.

FAUCET.

Application filed November 22, 1923. Serial No. 676,461.

*To all whom it may concern:*

Be it known that I, ANTHONY MARTEKA, a citizen of Poland, residing at Whitinsville, county of Worcester, and State of Massachusetts, have invented certain new and useful Improvements in Faucets, of which the following is a specification.

My invention relates to improvements in combination hot and cold water faucets in which water coming from two different sources of different temperatures are mixed to the desired temperature.

I attain these objects by the mechanism illustrated in the accompanying drawings, in which.

Similar numerals refer to similar parts throughout the several views.

Figure 1:
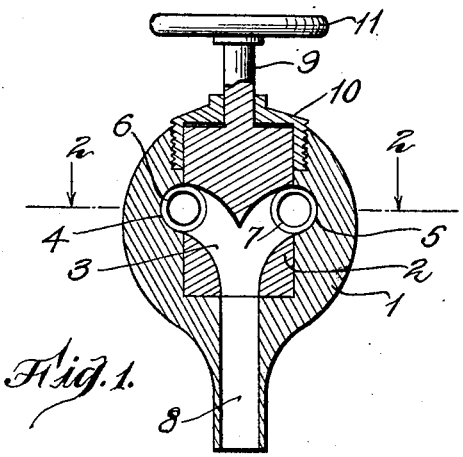
Figure 1 is a vertical cross section of the entire faucet on the line 1—1, Figure 2.
Figure 3:
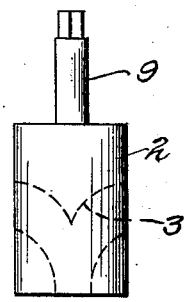
Figure 3 is a detail view of the inner rotating member.
Figure 2:
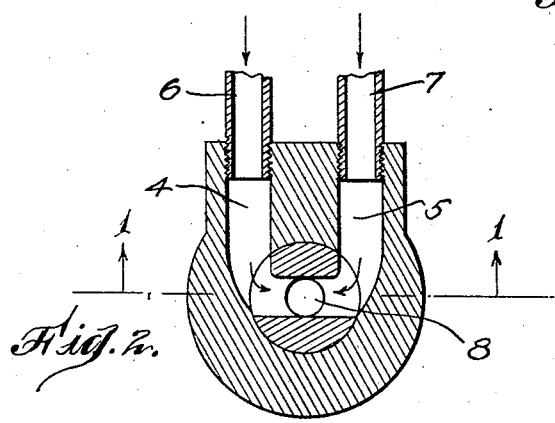
Figure 2 is a horizontal cross section of the faucet on the line 2—2, Figure 1.

The spherical shaped ball 1 constitutes the body of said water faucet, seated therein is a rotating member 2, having an aperture 3, said aperture 3 being in alignment with apertures 4 and 5 respectively, located in spherical shaped outer body 1 and connected to water supply pipes 6 and 7 respectively, the latter being screwed into the rear of outer body 1. The bottom of aperture 3 joins opening 8 in outer body 1. The upper end of said rotating member 2 carries a stem 9, fitting around said stem 9 is a lock-nut 10 screwed into body 1, thereby keeping member 2 properly seated into body 1, although allowing member 2 to rotate freely in outer body 1, by means of hand wheel 11, securely keyed to said stem 9.

In operation, water of different temperatures enter supply pipes 6 and 7 thereby entering apertures 4 and 5, thence to apertures 3 in member 2 which by the rotating of hand wheel 11 rotates member 2 having an aperture 3, thereby closing or opening the apertures 4 and 5 respectively; thus controlling the temperature of the incoming water supplied through pipes 6 and 7. The water being mixed to the desired temperature then passes downwardly through aperture 8.

Having thus described my invention what I claim as new and desire to secure by Letters Patent is:—

A combination faucet including a body formed with a central bore opening through the upper end and with an outlet leading from said bore, the body being formed with lateral inlets opening into the bore, a cylindrical valve mounted for rotation in and completely filling said bore and formed in the lower end with an outlet communicating with the outlet of the body and with divergent passages communicating with the valve outlet and opening through the side walls thereof, said passages communicating with the inlets of the body in one position of the valve, an operating handle extending from the valve, and a cap having threaded connection with the body in line with the bore and formed with an opening to permit the passage of the valve handle therethrough.

In testimony whereof I have affixed my signature.

ANTHONY MARTEKA.